(12) United States Patent
Iijima et al.

(10) Patent No.: US 7,321,410 B2
(45) Date of Patent: Jan. 22, 2008

(54) LIQUID CRYSTAL DISPLAY DEVICE AND ELECTRONIC APPARATUS

(75) Inventors: Chiyoaki Iijima, Ina (JP); Hiroshi Wada, Horigane-mura (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/503,949

(22) Filed: Aug. 15, 2006

(65) Prior Publication Data

US 2006/0274243 A1 Dec. 7, 2006

Related U.S. Application Data

(62) Division of application No. 10/808,405, filed on Mar. 25, 2004, now Pat. No. 7,176,997.

(30) Foreign Application Priority Data

Apr. 21, 2003 (JP) .............................. 2003-116365

(51) Int. Cl.
*G02F 1/1335* (2006.01)
*G02F 1/1343* (2006.01)

(52) U.S. Cl. ....................... 349/114; 349/143; 349/113; 349/61

(58) Field of Classification Search ................ 349/114, 349/113, 44, 146, 61, 143
See application file for complete search history.

(56) References Cited

U.S. PATENT DOCUMENTS

| 6,456,346 | B1 | 9/2002 | Arai |
| 6,501,521 | B2* | 12/2002 | Matsushita et al. ......... 349/106 |
| 6,552,767 | B1 | 4/2003 | Kanekeo |
| 6,630,970 | B2 | 10/2003 | Trapani et al. |
| 6,704,075 | B2 | 3/2004 | Takizawa et al. |
| 6,824,935 | B2 | 11/2004 | Tanaka et al. |
| 2002/0171791 | A1 | 11/2002 | Anno et al. |
| 2004/0223101 | A1 | 11/2004 | Yeh et al. |

FOREIGN PATENT DOCUMENTS

| CN | 1410814 A | 4/2003 |
| EP | 1 217 421 A2 | 6/2002 |
| JP | A 11-183892 | 7/1999 |
| JP | A 2000-029012 | 1/2000 |
| JP | A 2000-111902 | 4/2000 |
| JP | 2001-174797 | 6/2001 |
| JP | A 2002-341335 | 11/2002 |
| JP | A 2003-107461 | 4/2003 |
| JP | A 2003-177392 | 6/2003 |
| JP | A 2003-195296 | 7/2003 |

* cited by examiner

*Primary Examiner*—Mike Qi
(74) *Attorney, Agent, or Firm*—Oliff & Berridge, PLC

(57) ABSTRACT

The invention provides a liquid crystal display device capable of displaying colors clearly and with high visibility in both a reflective mode and a transmissive mode. The liquid crystal display device according to the invention can be a transflective liquid crystal display device including a reflection layer, color filters in which coloring layers of different colors are arranged corresponding to sub-pixel regions, and light shielding layers for partitioning the adjacent sub-pixel regions, and the transflective liquid crystal display device displays images in reflective regions and transmissive regions. Colored regions, in which the coloring layers of the color filters exist, and non-colored regions, in which the coloring layers do not exist, are provided in the reflective regions. Both the colored regions and the non-colored regions can be provided so as to overlap the light shielding layers along the longitudinal direction of the sub-pixel regions in plan view.

10 Claims, 11 Drawing Sheets

LIQUID CRYSTAL DISPLAY DEVICE AND ELECTRONIC APPARATUS

This is a Division of application Ser. No. 10/808,405 filed Mar. 25, 2004 now U.S. Pat. No. 7,176,997, which in turn claims priority from Japanese Patent Application No. 2003-116365, filed Apr. 21, 2003. The entire disclosures of the prior applications are hereby incorporated by reference herein in their entirety.

BACKGROUND OF THE INVENTION

1. Technical Field of Invention

The invention relates to liquid crystal display devices and electronic apparatuses. More particularly, the invention relates to the structure of a transflective liquid crystal display device in which color purity is well balanced both in a transflective mode and a transmissive mode.

2. Description of Related Art

Liquid crystal display devices capable of displaying images using external light, such as sunlight and artificial illumination in bright places and an internal light source, such as a backlight in dark places are provided. That is, the liquid crystal display devices use a display method that includes both a reflective mode and a transmissive mode. It is possible to clearly display images even in dark places and reduce power consumption by adapting the display method including both the reflective mode and the transmissive mode to convert the display mode into the reflective mode or the transmissive mode in accordance with the brightness of surroundings. According to the present specification, such kinds of liquid crystal display devices are referred to as transflective liquid crystal display devices. The number of cases in which coloring is required has recently increased in the field of the transflective liquid crystal display devices due to the development of portable electronic apparatuses and OA apparatuses. In order to meet the requirement, a transflective color liquid crystal display device in which color filters are provided in either the upper substrate or the lower substrate is provided. According to such a kind of liquid crystal display device, in the reflective mode, the external light incident from the upper substrate passes through the color filter, is reflected from a reflection layer, and passes through the color filters again. In the transmissive mode, the illumination light incident on the lower substrate from the backlight passes through the color filters. In a common structure, images are displayed using the same color filters in either of the reflective mode or the transmissive mode.

According to the liquid crystal display device, as mentioned above, it is possible to display colored images by letting the incident light pass through the color filters twice in the reflective mode and once in the transmissive mode. Accordingly, when color filters of light colors are used in consideration of the color during the reflective mode in which light passes through the color filters twice, it is difficult to display those colors clearly in the transmissive mode when light passes through the color filters only once. However, to the contrary, when color filters of deep colors are used in consideration of the color during the transmissive mode in which light passes through the color filters once, since images are darkly displayed in the reflective mode in which light passes through the color filters twice, it is not possible to obtain sufficient visibility. As mentioned above, according to the conventional transflective color liquid crystal display device, it is difficult to display those colors clearly and with high visibility in both the reflective mode and the transmissive mode.

In order to solve the above problems, a liquid crystal display device illustrated in FIG. 11 is suggested (see also, for example, Japanese Unexamined Patent Application Publication No. 2000-111902). The liquid crystal display device is an example of an active matrix liquid crystal display device. In the liquid crystal display device, data lines 101 and scanning lines 102 are arranged to intersect each other. Thin film transistors (hereinafter, abbreviated to as TFT) 103 and pixel electrodes 104 connected to the TFTs 103 are provided around the intersections. The pixel electrodes 104 are made of a metal film such as AlW (an alloy of aluminum and tungsten). The pixel electrodes 104 are constituted of reflection electrodes 105 related to display in the reflective mode and transparent electrodes 106, which are made of a transparent conductive film such as ITO (indium tin oxide), related to display in the transmissive mode. The reflection electrodes 105 are arranged so as to surround the transparent electrodes 106. The centers of the pixel electrodes 104 are transmissive regions T and the peripheries of the pixel electrodes 104 are reflective regions R. Color filters 111A, 111B, and 111C that are narrower than the pixel electrodes 104 are provided in the pixel electrodes 104. Therefore, the transmissive regions T overlap the color filters 111A, 111B, and 111C in plan view. In the reflective regions R, parts of the reflective regions R are colored regions C that overlap the color filters 111A, 111B, and 111C in plan view. The remaining parts of the reflective regions R are non-colored regions H that do not overlap the color filters 111A, 111B, and 111C in plan view.

In this structure, a part of the light incident from the upper substrate in the reflective mode passes through the non-colored regions H. The light obtained by passing through the color filters twice in the reflective mode is obtained by overlapping the non-colored light (white light) that passes through the non-colored regions H with the colored light that passes through the colored regions C. On the other hand, the light from the backlight, which passes through the transmissive regions T, in the transmissive mode passes through the colored regions C. All of the light obtained by passing through the color filters once in the transmissive mode becomes colored light. Therefore, since it is possible to reduce the difference in shading between the light obtained by passing through the color filters twice in the reflective mode and the light obtained by passing through the color filters once in the transmissive mode, it is possible to display colors clearly and with high visibility in both the reflective mode and the transmissive mode by optimizing the coloring layers of the color filters.

SUMMARY OF THE INVENTION

However, according to the conventional liquid crystal display device described in the Japanese Unexamined Patent Application Publication No. 2000-111902, this does not matter when displaying images in the transmissive mode. However, imbalance in color purity is significant when images are displayed in the reflective mode. The imbalance in color purity is generated in a display region of one product or in a plurality of products and, in particular, deteriorates the display quality of the reflective mode in the transflective color liquid crystal display device.

In order to solve the above problems, it is an object of the invention to provide a transflective color liquid crystal display device capable of displaying colors clearly in both a reflective mode and a transmissive mode and of reducing imbalance in color purity. It is another object of the invention to provide an electronic apparatus including the liquid crystal display device with high display quality.

In order to achieve the above object, a liquid crystal display device according to the invention is a transflective liquid crystal display device having a pair of substrates composed of an upper substrate and a lower substrate that face each other, a liquid crystal layer interposed between the pair of substrates, electrodes, which are provided on the pair of substrates, respectively, for driving the liquid crystal layer, a reflection layer, which is partially provided on the inner surface of the lower substrate, for reflecting light incident from the upper substrate, color filters provided above the reflection layer, in which coloring layers of different colors are arranged corresponding to sub-pixel regions that constitute a display region, and an illuminating device provided below the external surface of the lower substrate, and the transflective liquid crystal display device displaying images in a reflective region in which the reflection layer exists and in a transmissive region in which the reflection layer does not exist in every sub-pixel region, colored regions in which the coloring layers of the color filters exist and non-colored regions in which the coloring layers do not exist are provided in the reflective regions, and both the colored regions and the non-colored regions are provided so as to overlap the peripheries of the electrodes along the longitudinal direction of the sub-pixel regions in plan view. The sub-pixel regions can refer to one unit region as a reference constituting one pixel of full color in a display region corresponding to many different colors.

As described above, the liquid crystal display device in which the non-colored regions of the color filters are provided in the reflective regions can display colors clearly in both the reflective mode and the transmissive mode, however, the imbalance in color purity is significant. The inventor of the present invention found as a result of investigation that the disclination (deterioration of alignment) of the liquid crystal, which is generated at the edges of the electrodes of each sub-pixel region, is one of the factors that cause the imbalance in color purity. That is, an electric field (a line of electric force) generated in a liquid crystal layer between the upper substrate and the lower substrate operates in a direction vertical to the substrates around the center of each sub-pixel region. However, the electric field (the line of electric force) operates in a direction tilted with respect to the substrates at the periphery of the electrode. A horizontal electric field between adjacent electrodes also operates at the periphery of the electrode. As a result, since it is not possible to avoid the generation of the disclination of liquid crystal at the periphery of the electrode, contrast deteriorates. The degree to which the disclination is generated varies in accordance with a state of applying an electric field between electrodes and the irregularities in the manufacturing of each liquid crystal display device. When the sub-pixel regions are slim (for example, rectangular), since the area of the regions where the disclination is generated is larger at the peripheries of the electrodes along longitudinal direction than in the peripheries of the electrodes along the transverse direction, therefore contrast deteriorates.

According to the structure of the conventional liquid crystal display device illustrated in FIG. 11, the color filters 111A, 111B, and 111C are arranged in the center of the pixel electrodes 104 in a vertical direction in a strip shape. The peripheries of the pixel electrodes 104 along the longitudinal direction of the sub-pixel regions are the non-colored regions H. According to this structure, when the colored regions are compared with the non-colored regions, contrast hardly deteriorates in the colored regions, but significantly deteriorates in the non-colored regions. Therefore, when the reflectivity of colored light is almost uniform and the disclination is significant, the reflectivity of the white light deteriorates remarkably. When the disclination is hardly generated, the reflectivity of the white light is maintained. This proves that the disclination of the liquid crystal is one of the factors in the imbalance in color purity. The case in which the peripheries of the electrodes along the longitudinal direction of the sub-pixel regions are the non-colored regions is described on the basis of FIG. 11. The same is true of the case in which the peripheries of the electrodes along the longitudinal direction are contrarily the colored regions. That is, when the disclination is significantly generated, the reflectivity of the colored light deteriorates remarkably. When the disclination is hardly generated, the reflectivity of the colored light is maintained to thus cause the imbalance in color purity.

The liquid crystal display device according to the invention can be characterized in that the colored regions and the non-colored regions overlap the peripheries of the electrodes along the longitudinal direction of the sub-pixel regions in plan view. That is, the peripheries of the electrodes along the longitudinal direction of the sub-pixel regions do not overlap only one of the colored regions and the non-colored regions but overlap both the colored regions and the non-colored regions. As a result, when the disclination is generated in the peripheries of the electrodes, the colored regions and the non-colored regions are affected by the deterioration of the contrast caused by the disclination in the same way. For example, when the disclination is significant, the reflectivities of the white light and the colored light are significantly reduced. When the disclination is hardly generated, the reflectivities of the white light and the colored light are maintained. That is, regardless of the degree to which the disclination is generated, the ratios of the white light and the colored light that overlap each other are not changed from conventional ones. Therefore, although the entire reflectivity, that is, the brightness of reflective display is slightly changed by the degree to which the disclination is generated, it is possible to reduce the imbalance in color purity compared with conventional one.

In order to achieve the above object, another liquid crystal display device according to the invention is a transflective liquid crystal display device having a pair of substrates composed of an upper substrate and a lower substrate that face each other, a liquid crystal layer interposed between the pair of substrates, electrodes, which are provided on the pair of substrates, respectively, for driving the liquid crystal layer, a reflection layer, which is partially provided on the inner surface of the lower substrate, for reflecting light incident from the upper substrate, color filters provided above the reflection layer, in which coloring layers of different colors are arranged corresponding to sub-pixel regions that constitute a display region, light shielding layers for partitioning the adjacent sub-pixel regions, and illuminating means provided below the external surface of the lower substrate. The transflective liquid crystal display device displaying images in a reflective region in which the reflection layer exists and in a transmissive region in which the reflection layer does not exist in every sub-pixel region, colored regions in which the coloring layers of the color filters exist and non-colored regions in which the coloring layers do not exist are provided in the reflective regions, and both the colored regions and the non-colored regions are provided so as to overlap the light shielding layers along the longitudinal direction of the sub-pixel regions in plan view.

According to the above description, attention is paid to the disclination of the liquid crystal, which is generated in the peripheries of the electrodes, as one of the factors that cause the imbalance in color purity. The invention also focuses on the variations in the sizes of light shielding layers during the manufacturing processes of the liquid crystal display device including the light shielding layers (referred to as black matrices) for partitioning the adjacent sub-pixel regions as another factor. That is, the latticed light shielding layers may be placed between the adjacent sub-pixel regions in order to conceal the light leakage caused by the disclination of the liquid crystal in the peripheries of the electrodes and to prevent mixture of the respective colored light components that pass through the color filter. The variations in the sizes of the light shielding layers, however, are not prevented during the manufacturing processes. Therefore, the reflectivities in the peripheries of the sub-pixel regions are irregular. Also, when the sub-pixel regions are slim (for example, rectangular), the peripheries of the sub-pixel regions along the longitudinal direction are more affected by the variations in the sizes of light shielding layers than the peripheries of the sub-pixel regions along the transverse direction by the amount of the difference in lengths.

In this case, as mentioned above, like in the conventional liquid crystal display device, when the peripheries of the electrodes along the longitudinal direction of the sub-pixel regions are non-colored regions, in the case where the reflection ratio of the colored light is almost uniform and the width of the light shielding layers is larger than a designed value, the reflectivity of the white light is significantly reduced. When the width of the light shielding layers is equal to the designed value, the reflectivity of the white light is maintained. This proves that the variation in the sizes of light shielding layers is one of the factors in the imbalance in color purity. The same is true of the case in which the peripheries of the electrodes along the longitudinal direction are contrarily the colored regions.

The liquid crystal display device according to the invention can be characterized in that both the colored regions and the non-colored regions overlap the light shielding layers extending along the longitudinal direction of the sub-pixel regions in plan view. That is, the light shielding layers along the longitudinal direction of the sub-pixel regions do not overlap only one of the colored regions and the non-colored regions but overlap both the colored regions and the non-colored regions. As a result, even though the variations in the sizes of the light shielding layers are generated, variations in reflectivity are equally distributed in the colored regions and the non-colored regions. For example, when the widths of the light shielding layers increase, the reflectivities of the white light and the colored light are reduced. When the width of the light shielding layers is normal, the reflectivities of the white light and the colored light are maintained. That is, in either case, the ratios of the white light and the colored light that overlap each other are not changed from conventional ones. Therefore, the entire reflectivity, that is, the brightness of the reflective display slightly changes due to the variations in the sizes of the light shielding layers. However, it is possible to reduce the imbalance in color purity compared with conventional one.

The non-colored regions may have any shape as long as both the colored regions and the non-colored regions overlap the peripheries of the electrodes along the longitudinal direction of the sub-pixel regions or the light shielding layers along the longitudinal direction of the sub-pixel regions in plan view. However, it is preferred that the non-colored regions be extended along the transverse direction of the sub-pixel regions in a strip shape.

According to this structure, when the areas of the non-colored regions are equally fixed, it is possible to reduce the width of the non-colored region in the transverse direction. In general, since the colored layers of the color filters are thicker than the other layers that constitute the liquid crystal display device, the step difference between the colored region and the non-colored region is large. In this case, when the width of the non-colored region in the transverse direction is wide, it is difficult to level the step difference by an over-coating film in order to reduce the step difference of the color filter. However, when the widths of the non-colored regions of the color filters in the transverse direction are small, it is possible to easily level the step difference to thus prevent inconvenience in display from being caused due to the step difference in the color filters.

The transmissive region may be arbitrarily designed and arranged after securing the necessary area. However, for example, the plurality of transmissive regions may be arranged in the sub-pixel regions so as to be separated from each other. In particular, when the transmissive regions are small, since regions that contribute to transmissive display exist in parts of the sub-pixel regions, users feels some flickering in the images. However, according to the above structure, since the regions that contribute to the transmissive display are scattered in the sub-pixel regions, the flickering reduces.

When the plurality of transmissive regions is arranged in the plurality of sub-pixel regions in a zigzag shape, flickering in the images reduces.

It is preferable that among the sub-pixel regions corresponding to different colors, the area of the non-colored region in the sub-pixel region corresponding to at least one color be different from the areas of the non-colored regions in the sub-pixel regions corresponding to the other colors. According to this structure, since it is possible to control the reflectivities and the color purities of the respective colored light components in the respective sub-pixel regions corresponding to different colors, it is possible to control the reflectivity and the chromaticity (for example, color in white display) of the entire reflected light and to improve display quality such as the brightness and the color of display in the reflective mode.

To be more specific, when the coloring layers of different colors include a red layer, a green layer, and a blue layer, it is preferable that the area of the non-colored region in the sub-pixel region corresponding to the green layer be larger than the areas of the non-colored regions in the sub-pixel regions corresponding to the red layer and the blue layer.

The green light has much higher luminous efficiency than that of the red light or the blue light when seen from human's eyes. Therefore, it is possible to improve the reflectivity and the color reproducibility of the entire reflected light by setting the area of the non-colored region in the green sub-pixel region to be larger than the area of the non-colored region in the red or blue sub-pixel region.

In addition to the above structure, it is preferable that among the sub-pixel regions corresponding to different colors, the area of the transmissive region in the sub-pixel region corresponding to at least one color be different from the areas of the transmissive regions in the sub-pixel regions corresponding to the other colors.

According to this structure, since it is possible to control the transmittance ratios and the color purities of the respective colored light components in each of the sub-pixel regions corresponding to different colors, it is possible to control the transmittance ratio and the chromaticity (for example, the color in the white display) of the entire transmitted light. Therefore, since it is possible to control optical characteristics, such as the reflectivity, the transmittance ratio, the chromaticity of the reflected light, and the chromaticity of the transmitted light by controlling the transmittance ratio and the chromaticity of the entire transmitted light together with the area of the non-colored region, it is possible to optimize display quality in the reflective mode and the transmissive mode.

To be more specific, when the coloring layers of different colors can include a red layer, a green layer, and a blue layer, it is preferable that the area of the transmissive region in the sub-pixel region corresponding to the green layer be smaller than the areas of the transmissive regions in the sub-pixel regions corresponding to the red layer and the blue layer.

As mentioned above, since the green light has higher luminosity than that of the red or blue light, it is possible to maintain enough transmittance ratio without deteriorating color balance even if the area of the transmissive region in the green sub-pixel region is set to be smaller than the area of the transmitted region in the red or blue sub-pixel region.

The reflection layer may be made of a metal film, the reflection layer may be constituted of a reflection polarization layer obtained by making minute slits in a metal film. In particular, when the reflection layer is made of the reflection polarization layer, it is possible to reflect and re-use a part of the light that contributes to the transmissive display incident from the lower substrate and to thus improve the brightness of the transmissive display.

An electronic apparatus according to the invention can include the above liquid crystal display device of the present invention. According to this structure, it is possible to provide an electronic apparatus including a liquid crystal display unit capable of displaying colors clearly and with high visibility in both the reflective mode and the transmissive mode.

BRIEF DESCRIPTION OF THE DRAWINGS

The invention will be described with reference to the accompanying drawings, wherein like numerals reference like elements, and wherein.

DETAILED DESCRIPTION OF PREFERRED EMBODIMENTS

Figure 1:
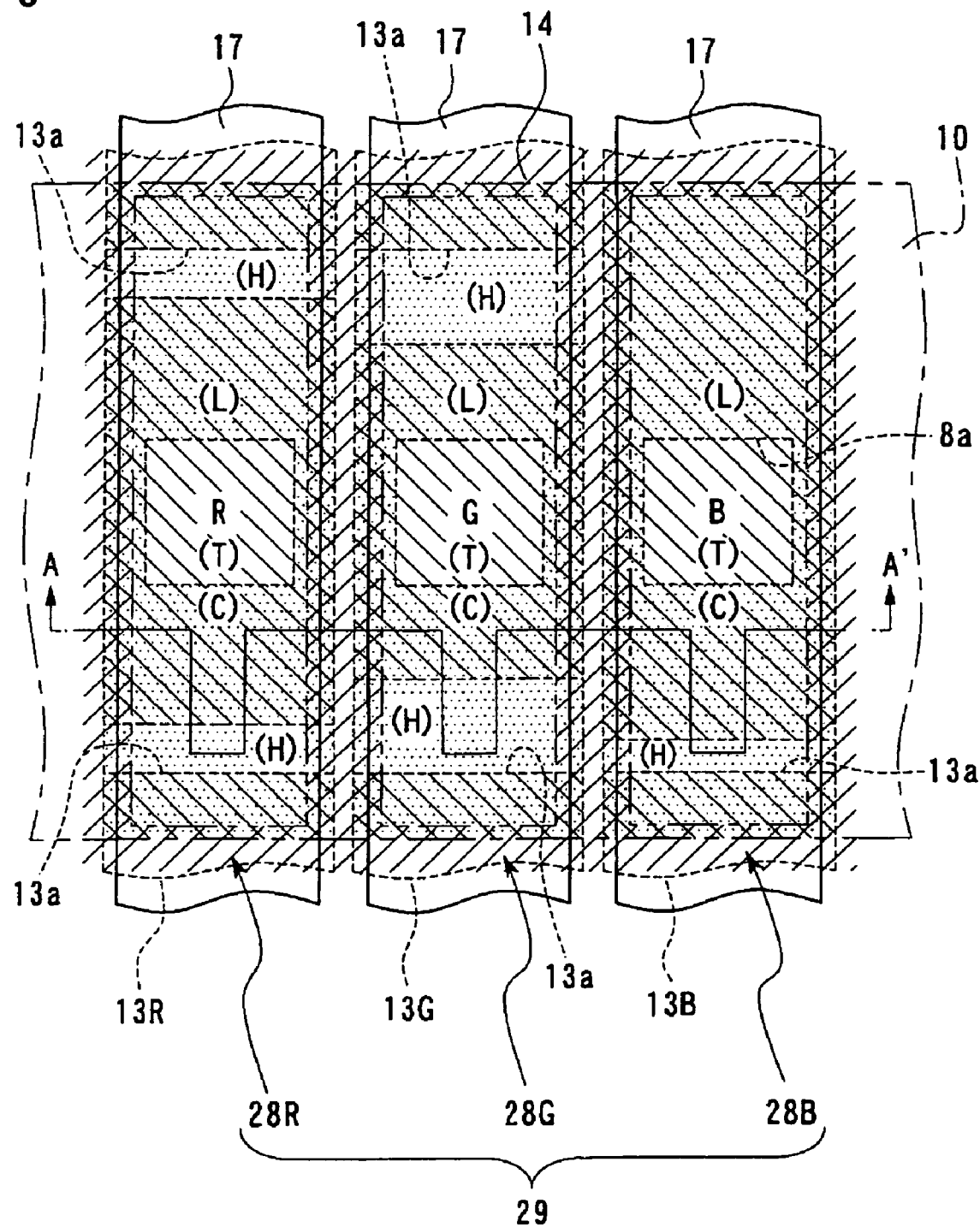
FIG. 1 is a plan view enlarging a pixel of a liquid crystal display device according to a first embodiment of the present invention.
Figure 2:
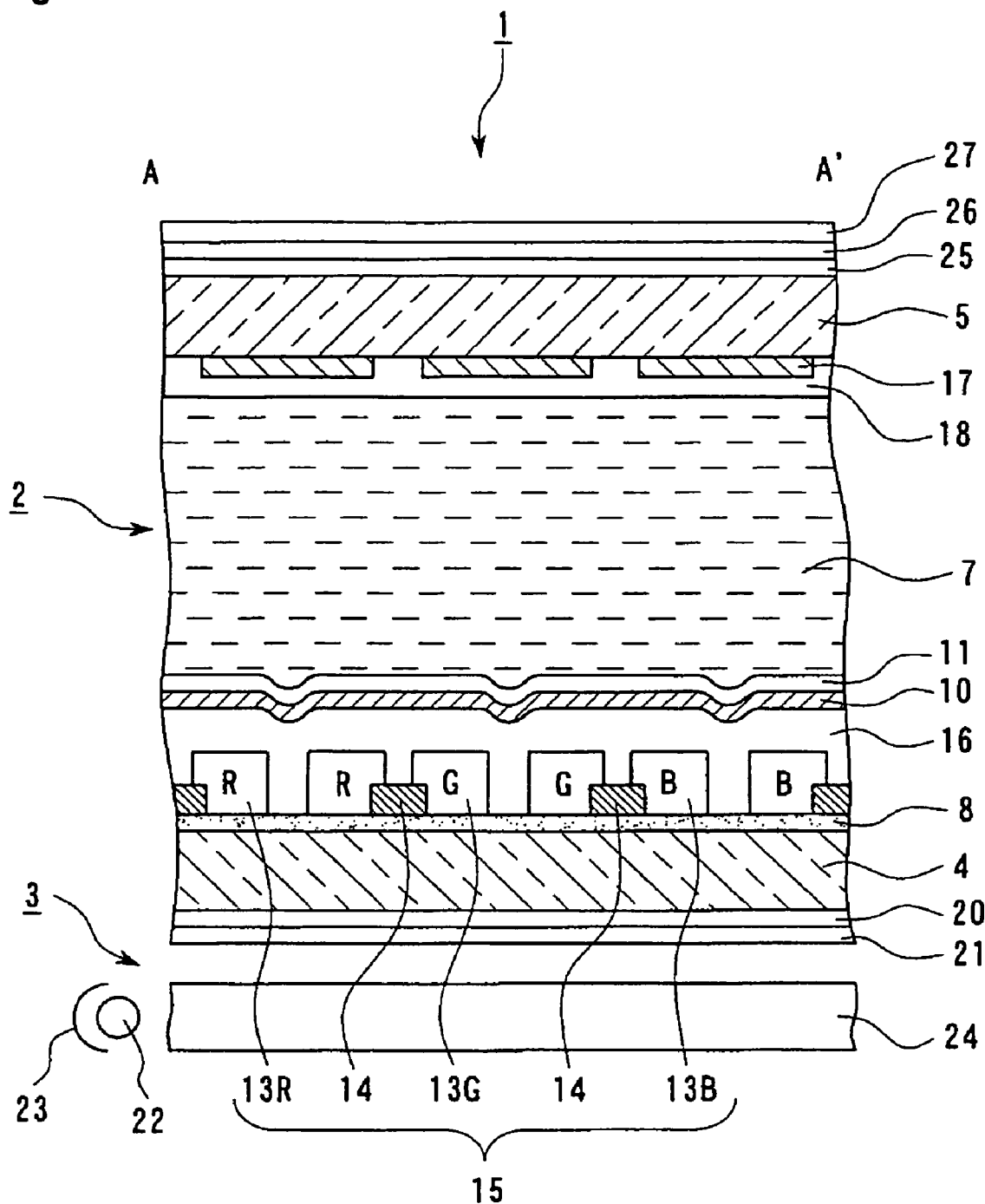
FIG. 2 is a sectional view taken along the line A-A's of FIG. 1.

A first embodiment of the present invention will now be described with reference to FIGS. 1 and 2. A liquid crystal display device according to the present embodiment is an example of a transflective color liquid crystal display device in passive matrices. FIG. 1 is a plan view enlarging a pixel that constructs a display region of the liquid crystal display device according to the present embodiment. FIG. 2 is a sectional view taken along the line A-A' of FIG. 1. In the drawings, ratio of the thickness of layers and the sizes of the respective components are varied to be recognizable.

As illustrated in FIG. 2, the liquid crystal display device 1 according to the present embodiment can include a liquid crystal cell 2 and a backlight 3 (illuminating device). In the liquid crystal cell 2, a lower substrate 4 and an upper substrate 5 are arranged to face each other through a sealing material (not shown). A liquid crystal layer 7 made of STN (super twisted nematic) liquid crystal is sealed in a space surrounded by the upper substrate 5, the lower substrate 4, and the sealing material. The backlight 3 is arranged below the liquid crystal cell 2 (outside the lower substrate 4).

A reflection layer 8 made of a metal film having a high reflectivity, such as aluminum or an aluminum alloy and silver or a silver alloy is formed on the inner surface of the lower substrate 4 made of a light transmissive material such as glass and plastic. Color filters 15 having red (R), green (G), and blue (B) coloring layers 13R, 13G, and 13B and light shielding layers 14 (black matrices) for partitioning the coloring layers 13R, 13G, and 13B of different colors are formed on the reflection layer 8. The light shielding layers 14 are made of a resin black or a metal, such as chrome, having a low reflectivity. An over-coating film 16 for leveling the difference in thickness between the respective coloring layers 13R, 13G, and 13B and for protecting the surfaces of the respective coloring layers 13R, 13G, and 13B is formed on the color filters 15. The over-coating film 16 may be made of a resin film, such as acryl and polyimide, and an inorganic film, such as a silicon oxide film. Segment electrodes 10 made of a transparent conductive film, such as an Indium Tin Oxide (ITO), are formed on the over-coating film 16 in a strip shape to be parallel to the sheet. An alignment film 11 made of polyimide on whose surface a rubbing process is performed is formed on the segment electrodes 10. On the other hand, common electrodes 17 made of a transparent conductive film such as the ITO are formed on the inner surface of the upper substrate 5 made of the light transmissive material such as glass and plastic in a strip shape so as to pass through the sheet. An alignment film 18 made of polyimide on whose surface a rubbing process is performed is formed on the common electrodes 17.

A retardation plate (a quarter wavelength plate) 20 and a polarizer 21 are formed on the external surface of the lower substrate 4 in this order from the lower substrate 4. Also, the backlight 3 is provided outside the polarizer 21. The backlight 3 can include a light source 22, such as a cold cathode fluorescent tube and a light emitting diode (LED), a reflection plate 23, and a light guide plate 24. Also, a front scattering plate 25, a retardation plate 26, and a polarizer 27 are formed on the external surface of the upper substrate 5 in this order from the upper substrate 5. The retardation plate (quarter wavelength plate) 20 and the polarizer 21 provided on the lower substrate 4 are for making circular polarized light incident onto the liquid crystal layer 7 in the transmissive mode. The retardation plate 26 and the polarizer 27 provided on the upper substrate 5 are for making the light that passes through the liquid crystal layer 7 in the reflective mode incident onto the reflection layer 23 as the circular polarized light. The front scattering plate 25 scatters the reflected light in the reflective mode to directions excluding regular reflection.

The arrangement of patterns on the respective substrates 4 and 5 is illustrated in FIG. 1. The segment electrodes 10 (whose outlines are marked with a one-dot chain line) extending to the horizontal direction of FIG. 1 are formed on the lower substrate 4 in a strip shape. The plurality of common electrodes 17 (whose outlines are marked with a solid line) extending to the vertical direction of FIG. 1 so as to be orthogonal to the segment electrodes 10 is formed on the upper substrate 5 in a strip shape. The respective R, G, and B coloring layers 13R, 13G, and 13B (whose outlines are marked with a dashed line) of the color filters 15 are arranged so as to correspond to the direction to which the common electrodes 17 extend. In other words, the color filters 15 according to the present embodiment are patterns referred to as vertical stripes, in which the respective R, G, and B coloring layers 13R, 13G, and 13B are vertically arranged in a strip shape. Therefore, one pixel 29 whose display pattern is constituted of three R, G, and B sub-pixel regions 28R, 28G, and 28B that are horizontally arranged as illustrated in FIG. 1 is provided. Also, the sub-pixel region is the minimum unit of display in the intersection between one segment electrode 10 and one common electrode 17. The latticed light shielding layers 14 (the black matrices) are provided so as to partition the adjacent sub-pixel regions 28R, 28G, and 28B. The apertures of the light shielding layers 14 are display regions that actually contribute to display. In FIG. 1, regions in which the light shielding layers 14 exist are hatched with forward leaning lines.

According to the present embodiment, in FIG. 1, the reflection layer 8 is provided almost over the entire surface (regions in which the reflection layer 8 exists are marked with dots). Rectangular apertures 8a of reflection layer 8 are provided in the center of the respective sub-pixel regions 28R, 28G, and 28B. The apertures 8a make the light from the backlight 3 incident on the liquid crystal layer 7 and are transmissive regions T related to the transmissive mode in the transflective liquid crystal display device. The other portions excluding the transmissive regions T, in which the reflection layer 8 exists, are reflective regions L related to the reflective mode. That is, the reflective regions L and the transmissive regions T exist in the respective sub-pixel regions 28R, 28G, and 28B.

The R, G, and B coloring layers 13R, 13G, and 13B of the color filters 15 are not provided in the entire regions of the sub-pixel regions 28R, 28G, and 28B. That is, in the coloring layers 13R, 13G, and 13B, apertures 13a are provided on the reflective regions L among the corresponding sub-pixel regions. The apertures 13a are non-colored regions H in which the coloring layers 13R, 13G, and 13B do not exist. The non-colored regions H extend in the shape of a band with almost uniform width along the transverse direction of the sub-pixel regions 28R, 28G, and 28B in FIG. 1. Therefore, the colored regions C in which the coloring layers 13R, 13G, and 13B exist and the non-colored regions H are arranged so as to overlap the light shielding layers 14 extended along the longitudinal direction of the sub-pixel regions 28R, 28G, and 28B in FIG. 1 in plan view. On the other hand, the R, G, and B coloring layers 13R, 13G, and 13B of the color filters 15 are provided in over the entire transmissive regions T. In FIG. 1, the regions (the colored regions C) in which the coloring layers 13R, 13G, and 13B exist are hatched with backward leaning lines.

According to the present embodiment, in the respective sub-pixel regions 28R, 28G, and 28B corresponding to the different colors of R, G, and B, the area of the reflective region L is equal to the area of the transmissive region T. However, the area of the colored region C is different from the area of the non-colored region H. To be specific, as illustrated in FIG. 1, one band shaped non-colored region H is provided in each of the upper portion and the lower portion of the R sub-pixel region 28R. One band shaped non-colored region H is provided in each of the upper portion and the lower portion of the G sub-pixel region 28G so as to be wider than the R sub-pixel region 28R. One band shaped non-colored region H is provided in the lower portion of the B sub-pixel region 28B. Therefore, the area of the non-colored region H in the G sub-pixel region 28G is the largest. The area of the non-colored region H in the R sub-pixel region 28R is smaller than the area of the non-colored region H in the G sub-pixel region 28G. The area of the non-colored region H in the B sub-pixel region 28B is the smallest.

In the liquid crystal display device 1 having the above structure, a part of the external light incident from the upper substrate 5 in the reflective mode passes through the non-colored regions H in the reflective regions L. The light obtained by passing through the color filters 15 twice in the reflective mode is obtained by overlapping the non-colored light that passes through the non-colored regions H with the colored light that passes through the colored regions C. On the other hand, the light that passes through the transmissive regions T from the backlight 3 in the transmissive mode passes through the colored regions C. The light obtained by passing through the color filters 15 once in the transmissive mode is colored light. Therefore, it is possible to reduce the difference in shadings between the light obtained by passing through the color filters 15 twice in the reflective mode and the light obtained by passing through the color filters 15 once in the transmissive mode. Further it is possible to display with clearly coloring and high visibility both in the reflective mode and the transmissive mode by optimizing the coloring layers 13R, 13G, and 13B of the color filters 15.

In the liquid crystal display device 1 according to the present embodiment, since the colored regions C and the non-colored regions H are arranged so as to overlap the light shielding layers 14 extending along the longitudinal direction of the sub-pixel regions 28R, 28G, and 28B in plan view, even though the variations in the sizes of the light shielding layers 14 is generated, variation in reflectivities is equally distributed between the colored regions C and the non-colored regions H. For example, when the widths of the light shielding layers 14 are large, the reflectivities of the white light and the colored light are reduced. When the widths of the light shielding layers 14 are normal, the reflectivities of the white light and the colored light are maintained. That is, the ratios of the white light and the colored light that overlap each other are hardly changed at any case. Therefore, the entire reflectivity, that is, the brightness of the reflective display is slightly changed due to the variations in the sizes of the light shielding layers 14. However, it is possible to reduce the imbalance in color purity compared with conventional one. The luminous efficiencies when seen from the human's eyes have the largest value in G light component and the smallest value in B light component, among the G light component, R light component, and B light component. According to the present embodiment, since the larger the luminous efficiency is, the larger the area of the non-colored region H is, it is possible to improve the reflectivity and the color reproducibility of the entire reflected light.

Figure 3:
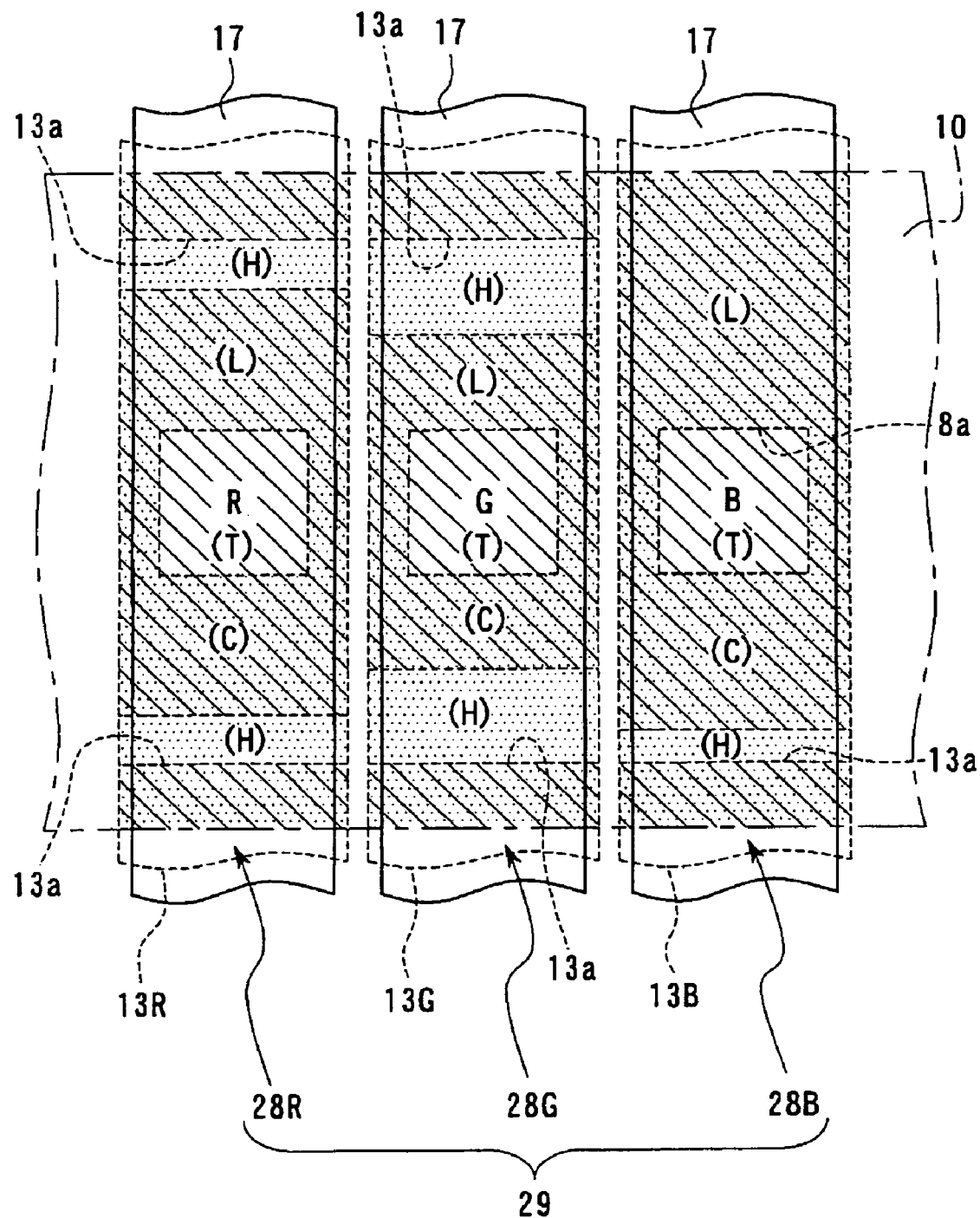
FIG. 3 is a plan view enlarging a pixel of a liquid crystal display device according to a second embodiment.

A second embodiment of the present invention will now be described with reference to FIG. 3. FIG. 3 is a plan view corresponding to FIG. 1 of the first embodiment, which enlarges a pixel that constitutes the display region of a liquid crystal display device according to the present embodiment. The basic structure of the liquid crystal display device according to the present embodiment is the same as that of the first embodiment excluding that the light shielding layers do not exist. Further, in FIG. 3, the same elements as those of FIG. 2 are denoted by the same reference numerals and detailed description thereof will be omitted.

According to the first embodiment, the light shielding layers 14 for partitioning the sub-pixel regions 28R, 28G, and 28B corresponding to the different colors R, G, and B are provided. However, according to the present embodiment, the light shielding layers 14 are not provided and both the colored regions C and the non-colored regions H overlap the peripheries of the common electrodes 17 along the longitudinal direction of the sub-pixel regions 28R, 28G, and 28B in plan view. The non-colored regions H are extended along the transverse direction of the sub-pixel regions 28R, 28G, and 28B in FIG. 3 in the shape of a band. It is similar to the first embodiment that the areas of the colored regions C and the non-colored regions H in each of the sub-pixel regions 28R, 28G, and 28B corresponding to the different colors R, G, and B are different from each other.

According to the liquid crystal display device of the present embodiment, it is possible to display colors clearly and with high visibility in both the reflective mode and the transmissive mode like in the first embodiment. Since both the colored regions C and the non-colored regions H are provided so as to overlap the peripheries of the common electrodes 17 along the longitudinal direction of the sub-pixel regions 28R, 28G, and 28B in plan view, even when the disclination is generated in the peripheries of the common electrodes 17, the deterioration of contrast due to the disclination is equally distributed between the colored regions C and the non-colored regions H. For example, when the disclination is significantly generated, the reflectivities of the white light and the colored light are significantly reduced. When the disclination is hardly generated, the reflectivities of the white light and the colored light are maintained. That is, the ratios of the white light and the colored light that overlap each other are not changed at any case. Therefore, the entire reflectivity, that is, the brightness of the reflective display is slightly changed depending on the degree to which the disclination is generated. However, it is possible to reduce the variation in the color purity compared with conventional one.

Figure 4:
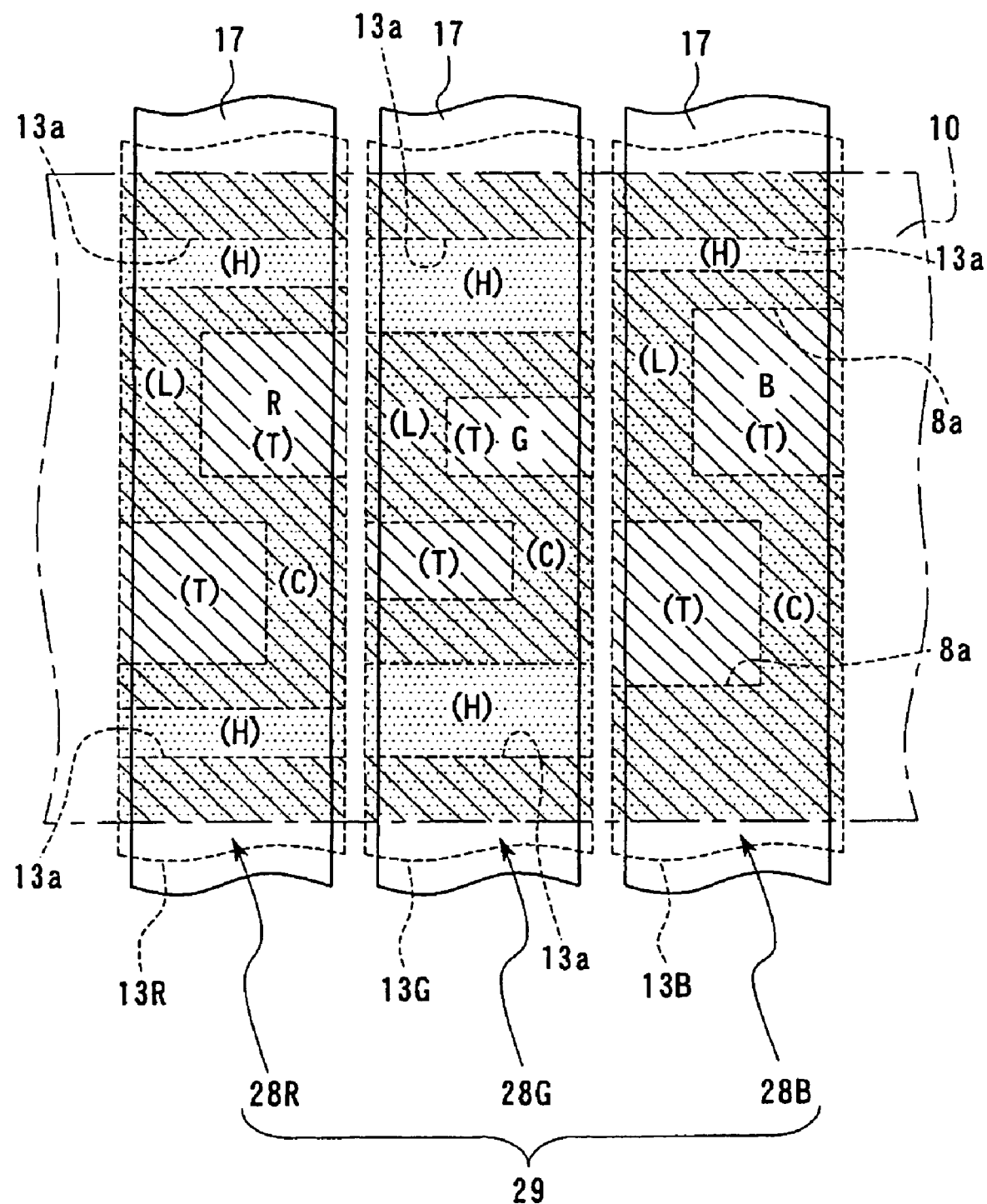
FIG. 4 is a plan view illustrating a modification of patterns of the liquid crystal display device.

According to the first and second embodiments, only one transmissive region T is provided in the center of each of the sub-pixel regions 28R, 28G, and 28B. However, instead of this structure, the structure illustrated in FIG. 4 may be adopted. In the structure of FIG. 4, two transmissive regions T are provided in each of the sub-pixel regions 28R, 28G, and 28B. The two transmissive regions T are arranged to be separated from each other and to overlap the sides that face each other extending along the longitudinal direction of the sub-pixel regions 28R, 28G, and 28B (the right and left sides extending to the vertical direction of FIG. 4). In FIG. 4, only one pixel is shown in the vertical direction. However, the plurality of transmissive regions T is arranged in a zigzag shape over the plurality of pixels 29 extending to the vertical direction.

For example, similarly to the first and second embodiments, when only one transmissive region T is provided in the center of each of the sub-pixel regions 28R, 28G, and 28B, in particular, if the transmissive regions T are small, small amounts of regions that contribute to the transmissive display exist in the center of the respective sub-pixel regions 28R, 28G, and 28B. Therefore, flickering in images may occur in the transmissive mode. However, according to the above-mentioned structure, since the transmissive regions T are scattered in a zigzag shape, it is possible to reduce flickering.

Also, in the example of FIG. 4, among the sub-pixel regions 28R, 28G, and 28B of different colors, the area of the transmissive regions T in the G sub-pixel region 28G is the smallest. The area of the transmissive regions T in the R sub-pixel region 28R is larger than the area of the transmissive regions T in the G sub-pixel region 28G. The area of the transmissive regions T in the B sub-pixel region 28B is the largest. That is, the area of the reflective region R in the G sub-pixel region 28G is the largest. The reflective region R in the R sub-pixel region 28R is smaller than the area of the reflective region R in the G sub-pixel region 28G. The reflective region R in the B sub-pixel region 28B is the smallest. It is similar to the first and second embodiments that the area of the non-colored regions H in each of the sub-pixel regions 28R, 28G, and 28B is different from each other.

In this case, since it is possible to control the reflectivities and the chroma of each colored light component in the reflective mode, and the transmittance ratio and the chroma of each colored light component in the transmissive mode every colors R, G, and B, it is possible to control the brightness and chromaticity of display (for example, color in white display) in the reflective mode and the brightness and chromaticity of display (for example, the color in the white display) in the transmissive mode. Therefore, it is possible to optimize appropriately the display quality in the reflective mode and the transmissive mode.

When the plurality of transmissive regions T is provided, the number of transmissive regions T may be any number other than two. However, as the number of transmissive regions T increases, the edge of the transmissive region T becomes longer under the condition that the area is secured. In this case, unbalance in the areas of the transmissive regions T is significant due to unbalance in processing such as etching in manufacturing processes. As a result, variation in the brightness of display in the transmissive mode and the reflective mode increases. Therefore, it is necessary to determine the number of transmissive regions T so that the flickering in the images and the variation in the brightness are well controlled. In consideration of the above, the number of transmissive regions T is preferably two when the plurality of transmissive regions T is provided.

Figure 5:
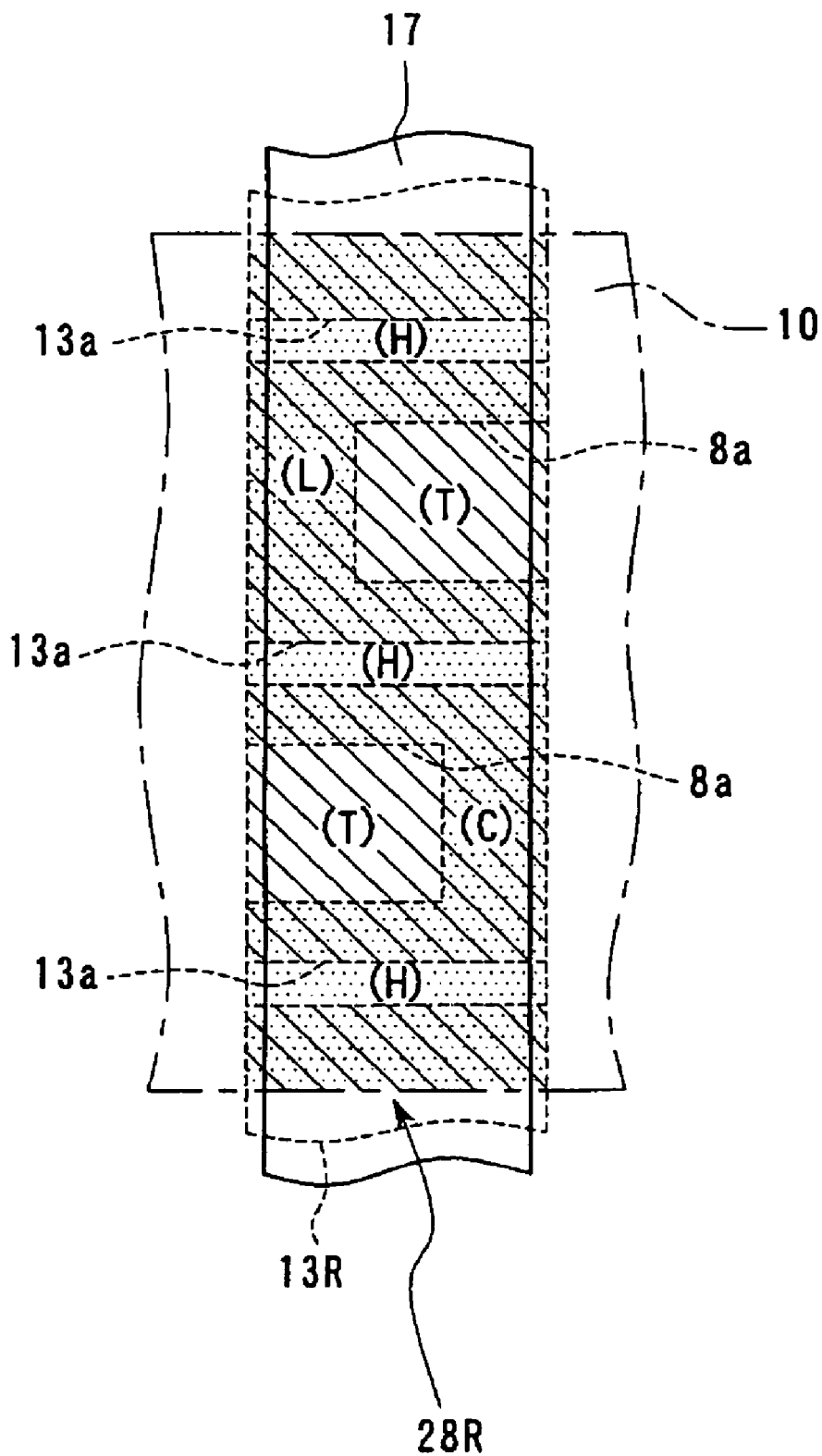
FIG. 5 is a plan view illustrating another modification of patterns of the liquid crystal display device.

FIG. 5 illustrates only the R sub-pixel region 28R among the sub-pixel regions that constitute one pixel. According to the first and second embodiments, the band shaped non-colored regions H are provided in the upper portion and the lower portion. However, as illustrated in FIG. 5, for example, the band shaped non-colored regions H may be provided in three positions, that is, in the upper and lower portions and in the center of the sub-pixel region 28R. When the areas of the non-colored regions H are equal to each other over the entire sub-pixel region, the area, furthermore, the width of one non-colored region H may be small when the number of non-colored regions H is large. When the widths of the non-colored regions H are small, since it is easy to level the differences in thickness of the color filters 15 by the over-coating film 16, it is possible to prevent inconvenience in display due to the difference in thickness of the color filters 15.

Figure 6:
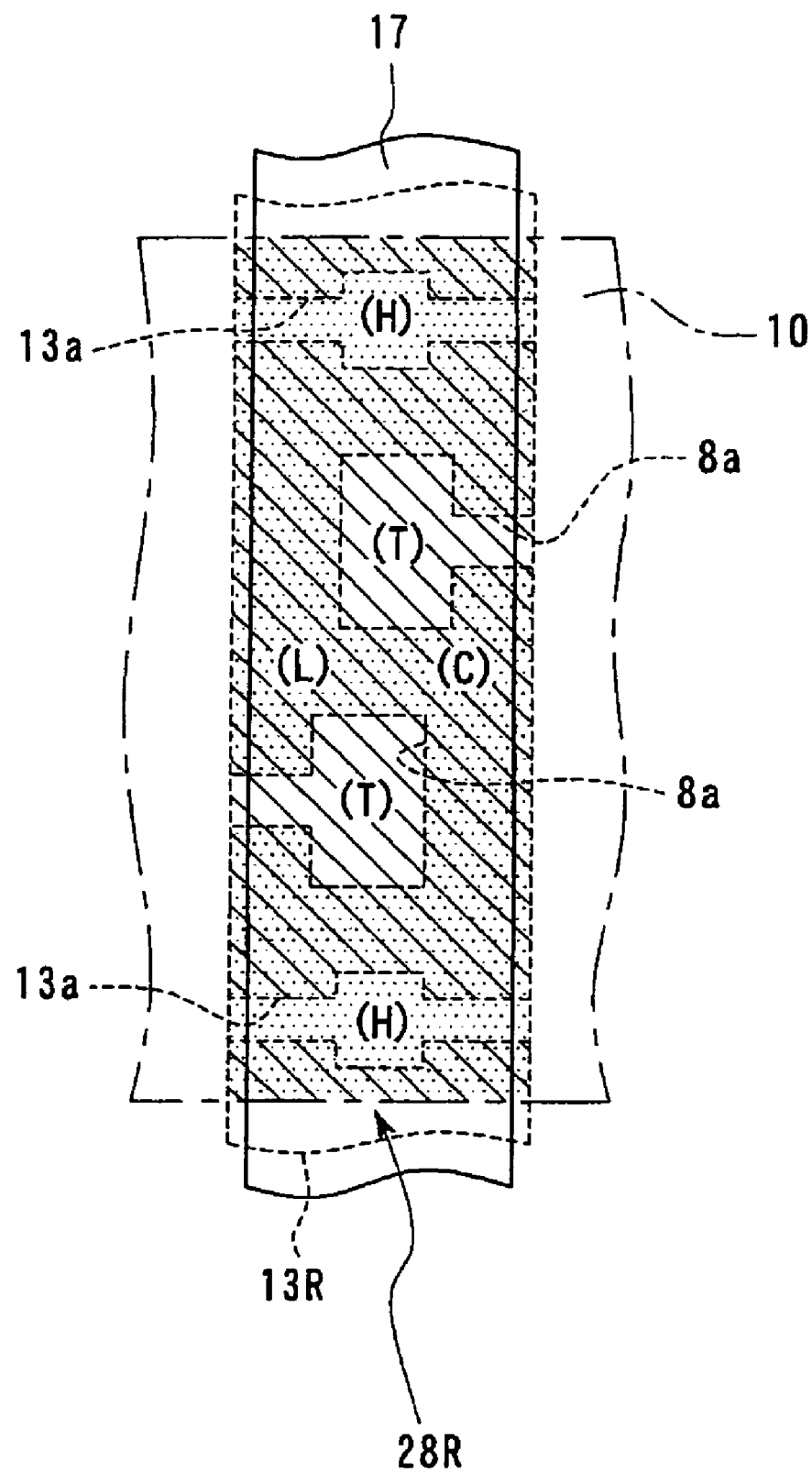
FIG. 6 is a plan view illustrating another modification of patterns of the liquid crystal display device.
Figure 7:
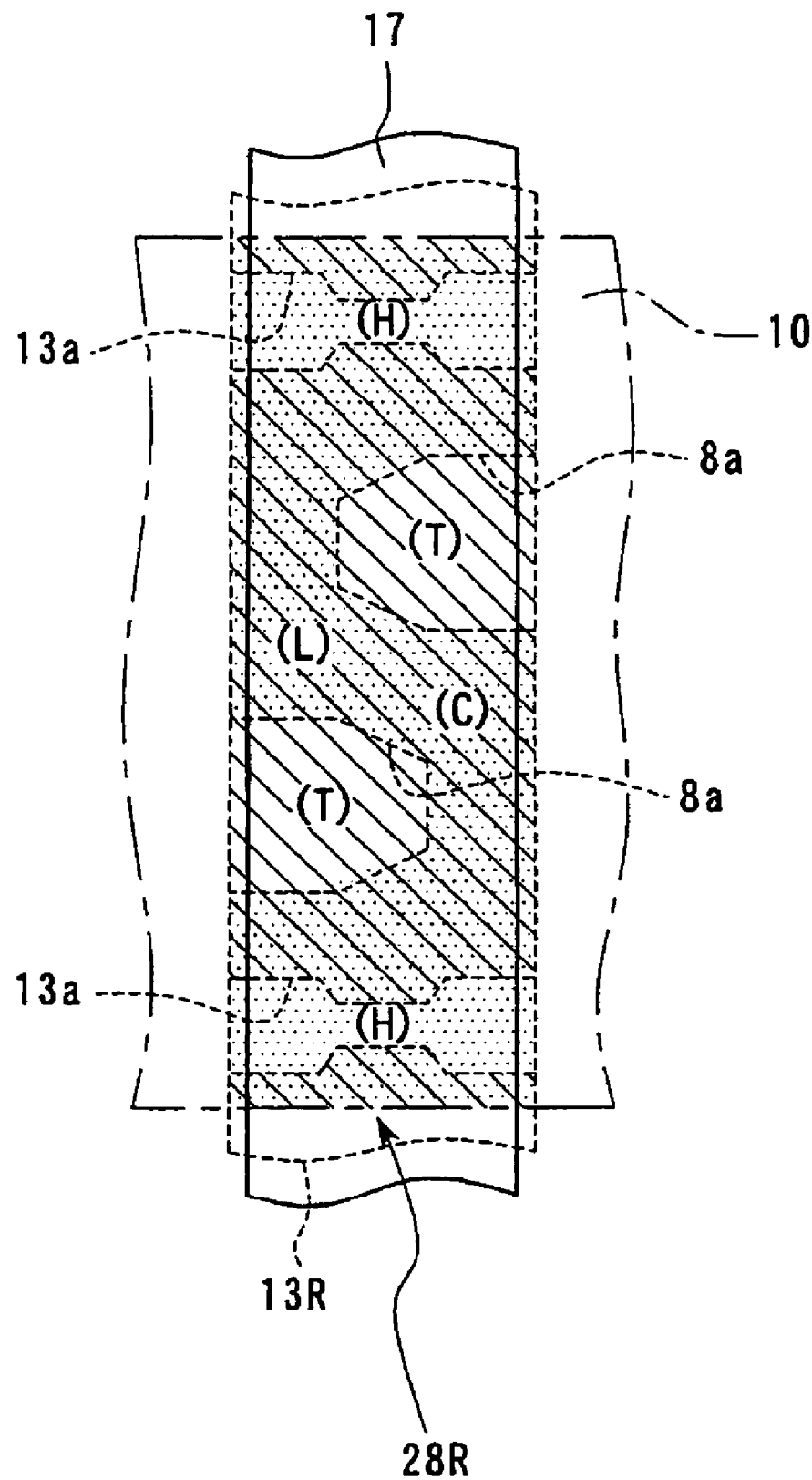
FIG. 7 is a plan view illustrating another modification of patterns of the liquid crystal display device.
Figure 8:
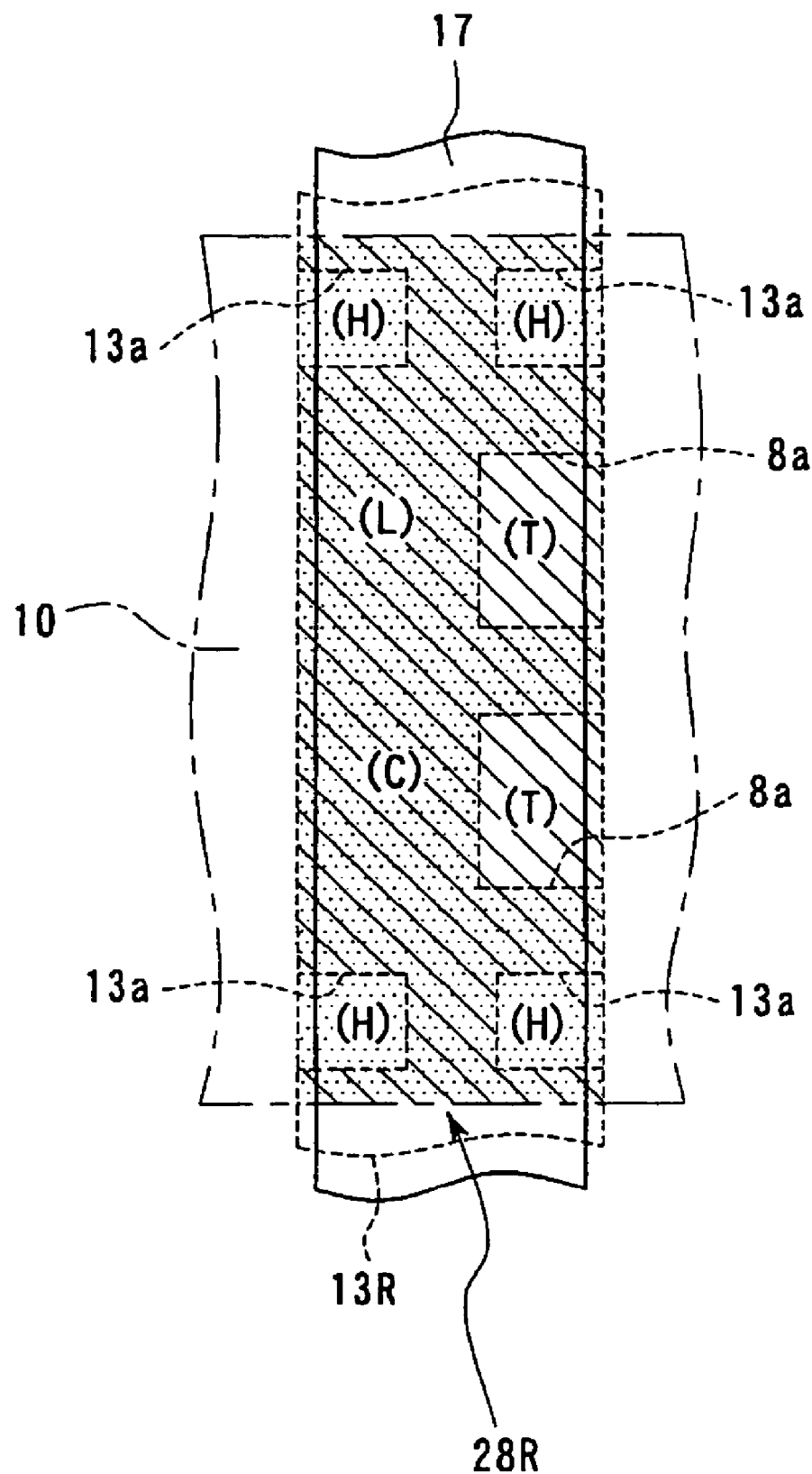
FIG. 8 is a plan view illustrating another modification of patterns of the liquid crystal display device.
Figure 9:
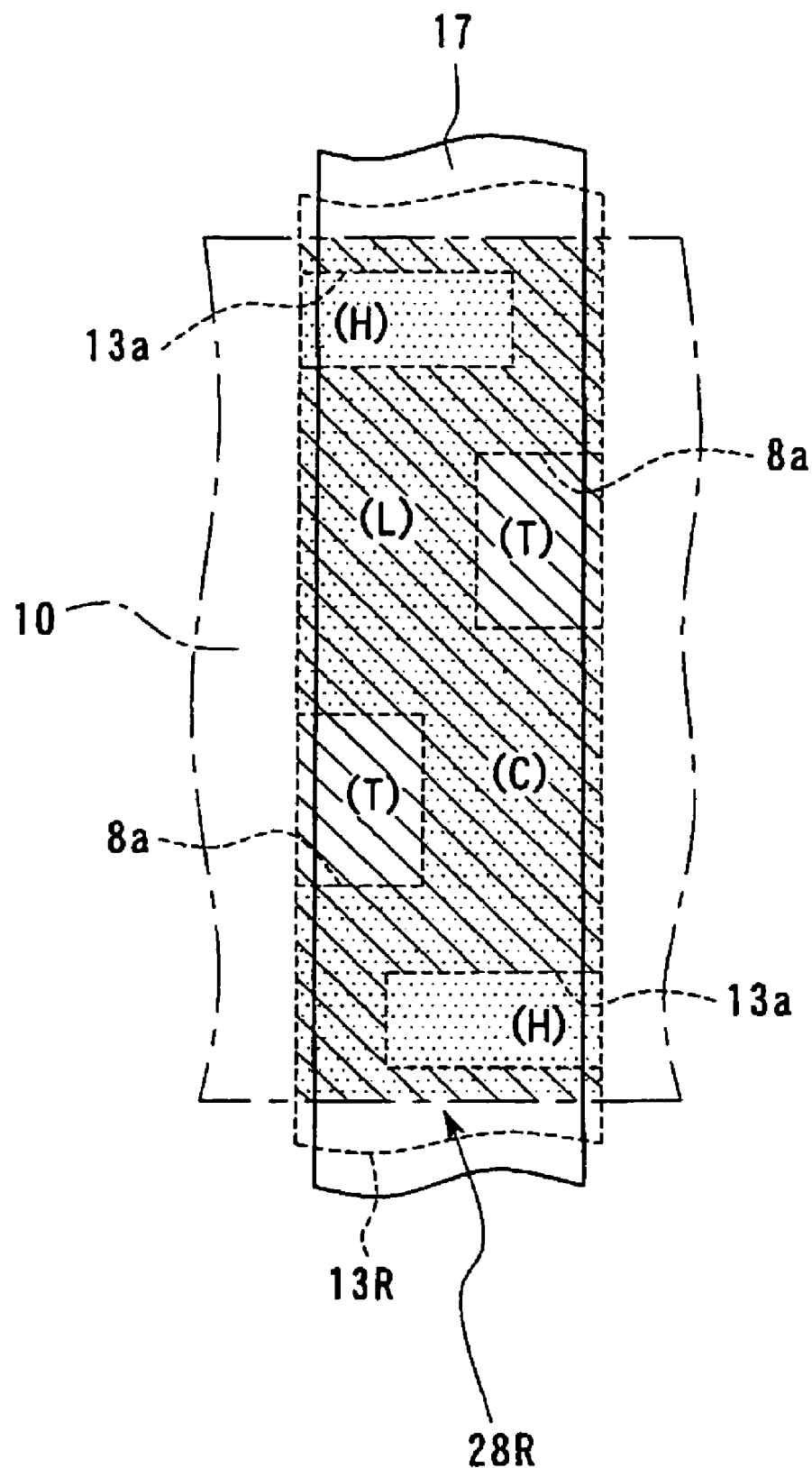
FIG. 9 is a plan view illustrating another modification of patterns of the liquid crystal display device.

According to embodiment, the band shaped non-colored regions H with uniform widths are provided. For example, as illustrated in FIG. 6, the band shaped non-colored regions H having wide-width portions in the center thereof are provided and the transmissive regions T having the difference from the shape of the non-colored regions H may be provided. As illustrated in FIG. 7, the band shaped non-colored regions H having narrow-width portions in the center thereof are provided and the transmissive regions T having the different shapes from the shape of the non-colored regions H may be provided. As illustrated in FIG. 8, the non-colored regions H may not be continuous band shaped along the transverse direction of the sub-pixel region 28R, but may be isolated and attached to the right and left sides along the longitudinal direction of the sub-pixel region 28R of FIG. 8. In this case, since the width of the non-colored region H required to secure the same area is larger than that of the band shaped non-colored region H, it is difficult to easily level the step differences of the color filters 15 using the over-coat film 16. Also, the two transmissive regions T may not be arranged in a zigzag shape. Also, as illustrated in FIG. 9, the non-colored regions H may be arranged in a zigzag shape. According to this structure, since the non-colored regions H are not continuous along the horizontal direction, it is possible to clearly display characters, etc.

An example of an electronic apparatus including the liquid crystal display device according to the above embodiments will now be described.

Figure 10:
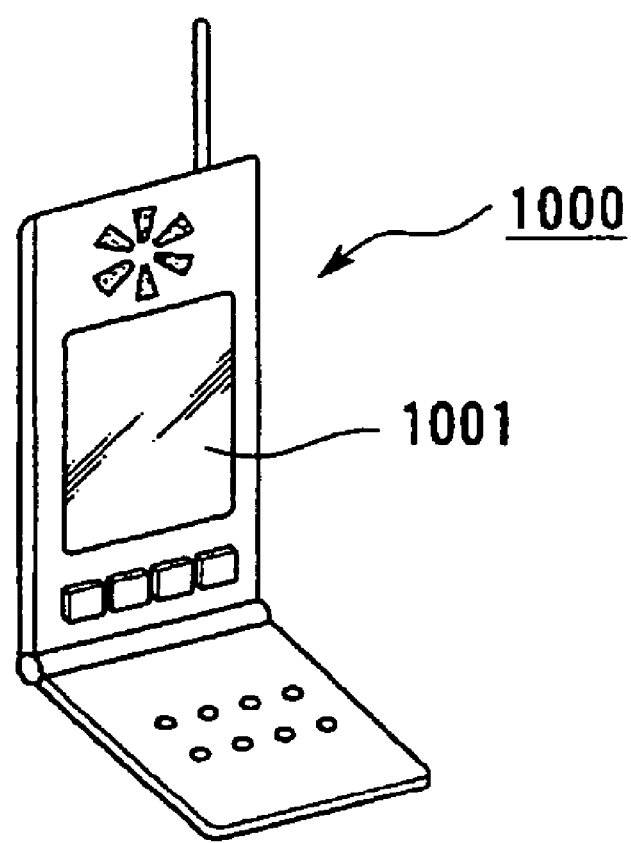
FIG. 10 is a perspective view illustrating an example of an electronic apparatus according to the present invention.
Figure 11:
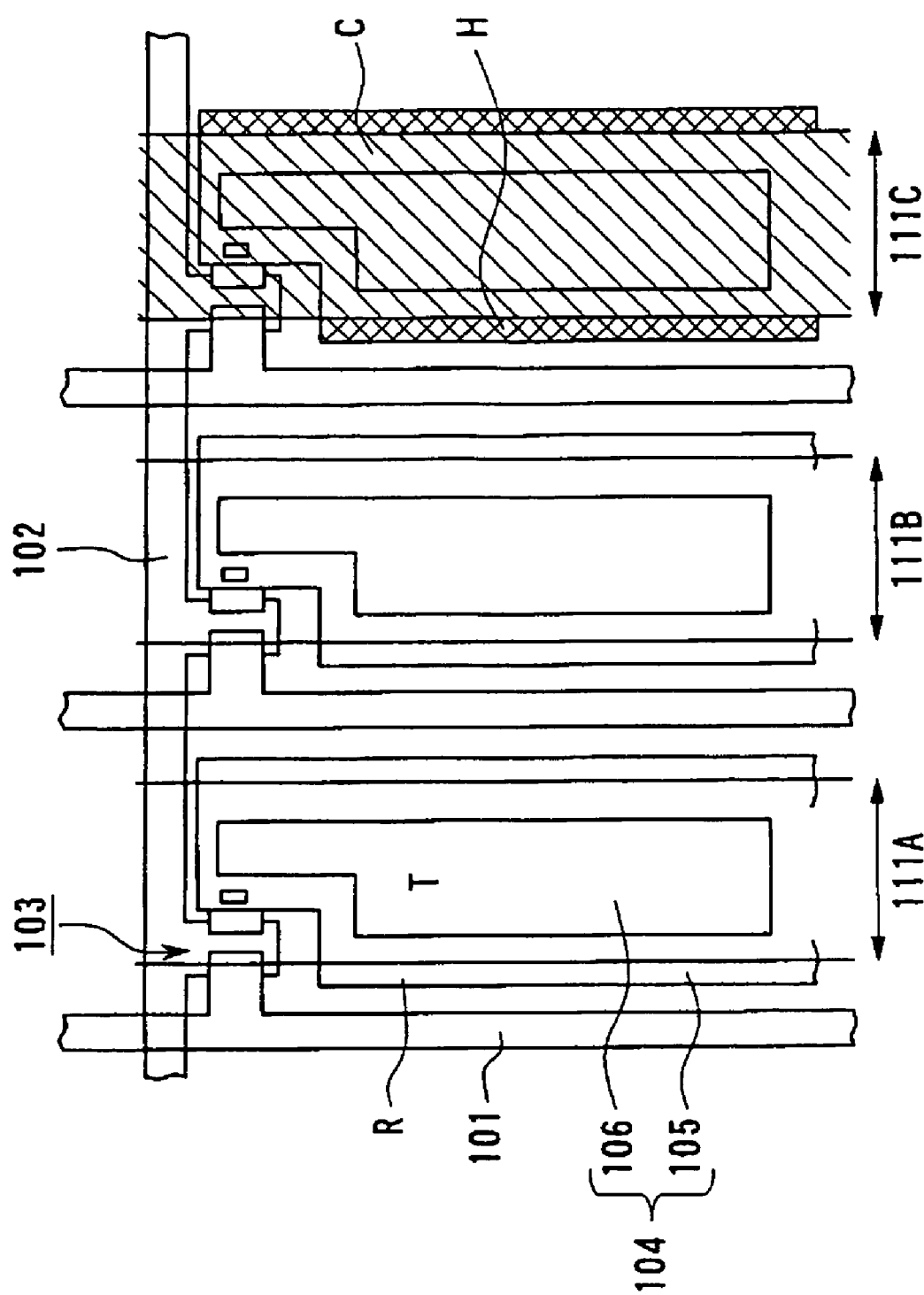
FIG. 11 is a plan view of a conventional transflective color liquid crystal display device.

FIG. 10 is a perspective view illustrating an example of a mobile telephone. In FIG. 10, reference numeral 1000 denotes the main body of a mobile telephone and reference numeral 1001 denotes a liquid crystal display unit using the liquid crystal display device.

Since the electronic apparatus illustrated in FIG. 10 includes the liquid crystal display unit using the liquid crystal display device according to the above embodiments, it is possible to realize an electronic apparatus including the liquid crystal display unit capable of displaying colors clearly and with high visibility in both the reflective mode and the transmissive mode.

It should be understood that the technical scope of the invention is not limited to the above embodiments and various changes may be made without departing from the spirit and scope of the present invention. For example, according to the above embodiments, a flat metal film is used as the reflection layer. However, a reflection polarization layer obtained by providing a minute slit in the metal film may be used as the reflection layer. In this case, it is possible to reflect and re-use a part of the light incident from the lower substrate, which contributes to the transmissive display, and to thus improve the brightness of the transmissive display. Also, according to the above embodiments, the patterns of the color filters are vertical stripes. However, the invention may be applied to color filters in horizontal stripes, in mosaic arrangement, and in delta arrangement. Also, the present invention is not restricted to the liquid crystal display devices in the passive matrices according to the above embodiments. The invention can be applied to liquid crystal display devices in active matrices using thin film diodes (TFD) and thin film transistors (TFT) as switching elements.

What is claimed is:

1. A transflective liquid crystal display device, comprising:
   a pair of substrates composed of an upper substrate and a lower substrate that face each other;
   a liquid crystal layer interposed between the pair of substrates;
   electrodes, which are provided on the pair of substrates, respectively, that drive the liquid crystal layer;
   a reflection layer, which is partially provided on an inner surface of the lower substrate, that reflects light incident from the upper substrate;
   color filters provided above the reflection layer, in which coloring layers of different colors are arranged corresponding to sub-pixel regions that constitute a display region; and
   an illuminating device provided below the external surface of the lower substrate,
   the transflective liquid crystal display device displaying images in a reflective region in which the reflection layer exists and in a transmissive region in which the reflection layer does not exist in every sub-pixel region,
   colored region in which the coloring layers of the color filters exist and non-colored regions in which the coloring layers do not exist being provided in the reflective regions,
   both the colored regions and the non-colored regions being provided so as to overlap peripheries of the electrodes along a longitudinal direction of sub-pixel regions in plan view, and
   the non-colored regions extending along a transverse direction of the sub-pixel regions in a shape of a band.

2. The transflective liquid crystal display device according to claim 1, wherein, among the sub-pixel regions corresponding to different colors, the area of the non-colored region in the sub-pixel region corresponding to at least one color is different from the areas of the non-colored regions in the sub-pixel regions corresponding to the other colors.

3. The transflective liquid crystal display device according to claim 2, wherein, among the sub-pixel regions corresponding to different color, the area of the transmissive region in the sub-pixel region corresponding to at least one color is different from the areas of the transmissive region in the sub-pixel regions corresponding to the other colors.

4. An electronic apparatus comprising the liquid crystal display device according to claim 1.

5. The transflective liquid crystal display device according to claim 1, the non-colored regions extending along a transverse direction of the sub-pixel regions in a strip shape.

6. A transflective liquid crystal display device, comprising:
   a pair of substrates composed of an upper substrate and a lower substrate that face each other;
   a liquid crystal layer interposed between the pair of substrates;
   electrodes, which are provided on the pair of substrates, respectively, that drive the liquid crystal layer;
   a reflection layer, which is partially provided on an inner surface of the lower substrate, that reflects light incident from the upper substrate;
   color filters provided above the reflection layer, in which coloring layers of different colors are arranged corresponding to sub-pixel regions that constitute a display region; and
   an illuminating device provided below the external surface of the lower substrate, the transflective liquid crystal display device displaying images in a reflective region in which the reflection layer exists and in a transmissive region in which the reflective layer does not exist in every sub-pixel region, colored region in which the coloring layers of the color filters exist and non-colored regions in which the coloring layers do not exist being provided in the reflective regions, both the colored regions and the non-colored regions being provided so as to overlap peripheries of the electrodes along a longitudinal direction of sub-pixel regions in plan view, and the non-colored regions continuously extending along a transverse direction of the sub-pixel regions.

7. The transflective liquid crystal display device according to claim 6, wherein, among the sub-pixel regions corresponding to different colors, the area of the non-colored region in the sub-pixel region corresponding to at least one color is different from the areas of the non-colored regions in the sub-pixel regions corresponding to the other colors.

8. The transflective liquid crystal display device according to claim 7, wherein, among the sub-pixel regions corresponding to different colors, the area of the transmissive region in the sub-pixel region corresponding to at least one color is different from the areas of the transmissive region in the sub-pixel regions corresponding to the other colors.

9. An electronic apparatus comprising the liquid crystal display device according to claim 6.

10. The transflective liquid crystal display device according to claim 6, the non-colored regions extending along a transverse direction of the sub-pixel regions in a strip shape.

* * * * *